Jan. 21, 1964     M. G. DREYFUS     3,119,086

WEDGE IMMERSED THERMISTOR BOLOMETERS

Filed Aug. 29, 1961

*INVENTOR.*
MARC G. DREYFUS

BY

*ATTORNEY*

United States Patent Office 3,119,086
Patented Jan. 21, 1964

3,119,086
WEDGE IMMERSED THERMISTOR BOLOMETERS
Marc G. Dreyfus, Stamford, Conn., assignor to Barnes Engineering Company, Stamford, Conn., a corporation of Delaware
Filed Aug. 29, 1961, Ser. No. 134,619
7 Claims. (Cl. 338—18)

This invention relates to a wedge immersed thermistor bolometer for the detection of optical radiations, i.e., ultraviolet, visible and particularly infrared.

Immersed thermistor bolometers in which the thermistor flakes are immersed in a lens or half immersed, by optical contact on a lens, have achieved great success in instruments particularly for the use in the infrared. Two types of immersed bolometers are described and claimed in patents to Wormser No. 2,983,888 and De Waard No. 2,994,053. The effect of immersion, to greatly increase the sensitivity of a thermistor bolometer, results from the greater concentration of the incoming energy over a smaller area. This produces a more intense response.

While bolometers have been immersed by contact with various lens materials such as fused aluminum oxide, beryllium oxide and the like, the much higher refractive indices of the semiconductor materials such as germanium and silicon (and in particular germanium, which has a refractive index of four), yield the greatest increase in bolometer speed by immersion. As a result, where the wavelengths of the radiation to be detected are longer than 1.8μ, the semiconductors and in particular germanium are often used as the lens materials. The present invention will be described in connection with bolometers in which the active detector element is optically contacted, or immersed, onto the surface of a semiconductor such as germanium. It should be understood that the invention is not limited to particular lens materials and may involve operation with any optical radiation including the visible or any transparent lens material. As the greatest advantages in immersed bolometers are obtained with the very high refractive index material used in infrared instruments these form the preferred embodiment of the present invention which, however, is not limited thereto. The invention is essentially an optical one and its advantages are obtained regardless of what lens material is used in the immersed bolometer.

Some general considerations are needed to appreciate the specialized type of problem which is solved by the present invention. In ordinary practice the field of view of the lens in which the detector is immersed, or the aperture of that lens, is symmetrical such as round or square. In a number of specialized instruments in which immersed detectors are to be used, either the field stop or the entrance pupil of the immersion optics, or both, depart markedly from round or square, that is to say the stop aspect ratio departs markedly from unity. The present invention deals with the problems presented by this type of instrument. It permits marked improvement in sensitivity of response, and in some cases also improved mechanical structure.

In determining aspect ratio the direction of the long axis of the stop or pupil must be considered; that is to say the ratio is always based on the direction of the sides. For example, if a field stop with a horizontal angular subtense five times the vertical is combined with an entrance pupil in which the vertical is five times the horizontal the product of these two aspect ratios is unity and the present invention cannot be used to improve response. When, however, the product of the ratios is not unity then the present invention can be used advantageously. The magnitude of the improvement is proportional to the square root of the product of the aspect ratios.

While as is pointed out above the present invention broadly is capable of improving instruments when the product of the aspect ratios of field stop and entrance pupil departs from unity, the most important single field is where the entrance pupil has a comparatively high aspect ratio. A type of instrument in which the problem becomes very acute is presented by spectrometers where different wavelength bands are represented by long and comparatively narrow slits in the spectral focal plane and where the energy through these slits is to be focused on as small a detector as possible. In addition to improved sensitivity of response, the present invention often permits improved mechanical structure in this case, since there is not room to mount a series of symmetrical immersed bolometers behind the slits of the spectrometer when those slits are close together.

According to the present invention, in such a case, the entrance pupil of the wedge lens roughly conforms to the slit's length and width and is in the form of a small slice through the symmetrical immersion lens. In this case, the lens front surface is partially masked by the spectrometer slit and might equivalently be considered as trimmed or cut to yield pieces having full lens dimension in one direction corresponding to the long dimension of the spectrometer slits, and having the other dimension smaller coresrponding to the slit width. Energy incident along the long meridian of the slit is refracted by the immersion lens surface and directed toward the thermistor flake with the maximum convergence consistent with the critical angle of the immersion interface. The image size at the immersion interface is inversely proportional to the convergence of the image-forming rays. Therefore the detector flake size is minimized and its response is maximized by the immersion lens refraction for the fan of rays incident along the long meridian of the slit.

When the lens focal length is such as to converge the two rays from the ends of the slit at an optimally steep angle onto the detector, the rays from opposite points from the two sides of the slit are not converged as steeply. The detector flake could be made smaller and more sensitive if the convergence in that azimuth were made greater. According to the present invention, the equivalent of this increased convergence in one azimuth is obtained by making the sides of the immersion lens slice at an angle to form a funnel or wedge. Practical construction may depart slightly from theoretical perfection but the difference is small and the improvement achieved is in proportion to a very large fraction of the square root of the aspect ratio product. The width of the edge of the wedge cannot be decreased indefinitely because of a limitation imposed by the critical angle at the immersion interface. Therefore, the edge of the wedge has to be of finite width, the limits to which are set in each case by the nature of the materials of which the wedge and immersion interface are formed.

It should be noted that the present invention, in its most important commercial aspect, is applied to instruments in which the entrance pupil of the immersion optics has a high aspect ratio. In this case it effects marked improvement in noise equivalent power of the system with considerable concomitant savings in weight and in size. For certain instrumental use this improvement is vital.

The invention will be described in more detail in conjunction with an immersion bolometer for infrared spectrophotometric use and in connection with the drawings in which.

Figure 1:
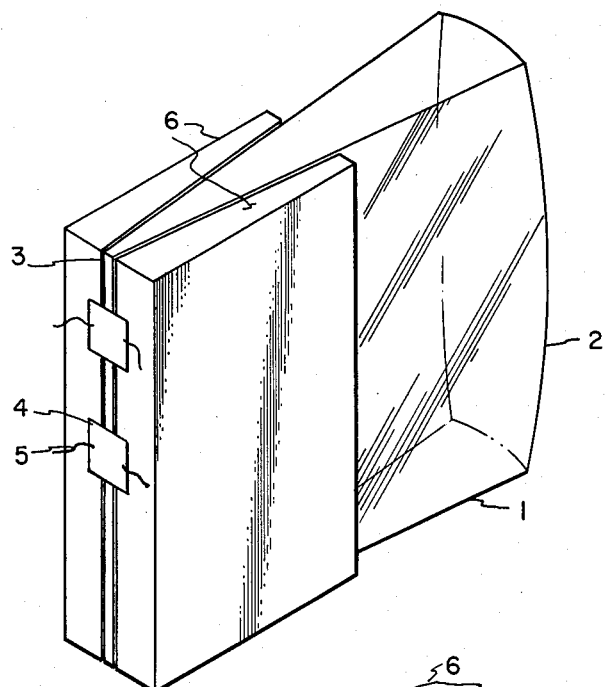
FIG. 1 is an isometric view of a wedge immersed bolometer.

The wedge lens 1 is of germanium with a spherical front surface 2 having an aspect ratio of about 5:1. A narrow edge of the wedge 3 extends into a holder made up of two germanium wedges 6 spaced by thin pieces of plastic 7, which may be in the form of buttons or strips the whole being cemented together with a suitable epoxy cement 8. The active thermistor flake 4 with attached leads 5 is immersed on the thin edge of the wedge with the customary insulating layer of arsenic modified selenium 9. As is customary the leads are connected to the thermistor through an area of thin deposited gold. This defines an active area of flake 10 which is the dimension that determines responsivity. The gold film is so thin that it cannot be clearly shown in a drawing and the active area is, therefore, shown by two boundary lines. Theoretically the wedge would operate even more effectively if the holders 6 were absent. However, this is a mechanically impractical structure, since support is needed for the flake leads. Also it is difficult to polish a narrow edge effectively unless it is held between larger surfaces. Therefore, the spaced germanium holder performs both of these necessary functions.

Figure 3:
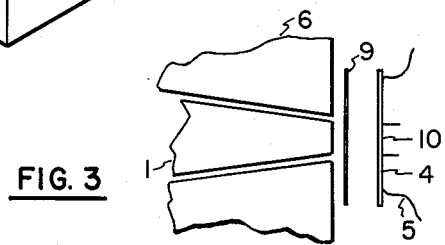
FIG. 3 is an enlarged detail of the edge of the wedge with attached detectors.
Figure 2:
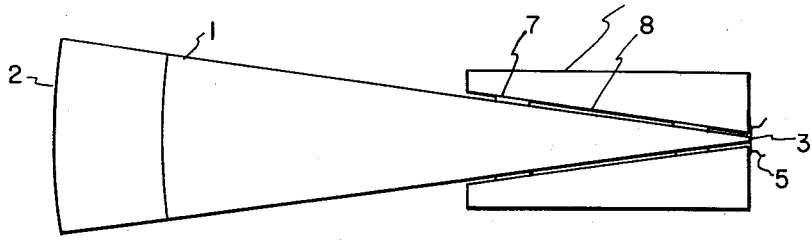
FIG. 2 is a horizontal cross-section.

In FIG. 2 the cement layers 8 and the plastic spacers 7 are greatly exaggerated in thickness. In order to show the thin edge of the wedge 1 with the very thin insulating layer 9 and flake 4, the parts are shown exploded in FIG. 3. Ideally the polished sides of the germanium wedge should contact air as this would produce practically perfect internal reflection. However, the very thin layer of cement does not degrade performance significantly though from rigorous theoretical considerations the internal reflection is slightly frustrated and introduces losses due to the fact that when internally reflected the radiation wave penetrates of the order of about a tenth of a wavelength into the medium of lower refractive index. Some loss may occur by absorption in this short path but with suitable cements the absorption is very small and with a typical cement amounts to a very few percent.

The supports represented by the wedges 6 may be of almost any suitable constructional material. Germanium is shown in the drawings for the supports. This minimizes problems due to differential thermal expansion of the supports and the central wedge 1. The aspect ratio illustrated is 5:1 and effects an improvement in sensitivity, due to flake size reduction, approximating the square root of the ratio which approximately doubles the sensitivity that would have been obtained if the wedge shape had not been used to compensate for the departure of the aspect ratio product from unity. One of the factors which reduces the gain somewhat from the theoretical is a geometrical property of the front surface of the wedge lens. With any aspect ratio there is an area on the wedge lens surface of the general shape of an ellipse over which the theoretical gain is obtained; however, in the corners of the lens surface there are small areas where the efficiency is less than 100%. For example, the elliptical area approximates 80 percent of the total area and the fall-off of efficiency beyond this area depends on the aspect ratio. The fall-off is more with a higher aspect ratio than with a lower one.

A series of wedge immersed bolometers can be used behind an infrared spectrometer, each lens receiving only a narrow band of infrared radiation of a particular wavelength. When the lenses are packed very close together, as is sometimes necessary where the different wavelengths are near each other, there is a slight possibility that radiation from one band might get onto an adjacent immersed bolometer. This can be avoided by projecting baffles between the lens slices.

The construction of the wedge immersed bolometer of the present invention requires close tolerances. However, the craftsmanship required in manufacture is available in high precision instrument construction.

In the drawings there has been shown a hyper-immersed bolometer, that is to say one in which the radiation detectors are on a surface beyond the center of curvature of the face of the immersion lens. It is possible, however, to use the present invention in conjunction with bolometers which are either hypoimmersed or immersed, that is to say with detector elements located between the center of curvature of the front surface of the lens and the surface or at the center of curvature itself.

I claim:

1. In an instrument having a field stop and an entrance pupil the product of the aspect ratios of field stop and entrance pupil departing significantly from unity, the improvement which comprises in optical alignment to receive radiation passing through the field stop,
    (a) a wedge shaped immersion lens the front surface of which has an aspect ratio along othogonal meridians differing from unity, the long meridian being parallel to the long dimension of the field stop, the lens having wedge surfaces tapering from the smaller meridian to a narrowed rear surface,
    (b) the wedge surfaces being bounded by material of lower refractive index than the lens material, and
    (c) at least one radiation detector immersed on the tapered edge.

2. A wedge immersed bolometer according to claim 1 in which the radiation detector is a thermistor.

3. A wedge immersed bolometer according to claim 2 in which the wedge material is germanium.

4. A wedge immersed bolometer according to claim 3 in which the tapered edge of the wedge is mounted in a tapered support separated from the wedge by material of much lower refractive index than germanium, the separation being at least about one-tenth wavelength of the longest radiation for which the bolometer is to be used, said material of lower refractive index having at least moderate transmission for radiations of the wavelengths for which the bolometer is to be used.

5. A wedge immersed bolometer according to claim 4 in which the support members are of germanium separated from the germanium wedge by the material of lower refractive index.

6. A wedge immersed bolometer according to claim 1 in which the aspect ratio of the orthogonal meridians is of the order of 5:1.

7. A wedge immersed bolometer according to claim 3 in which the aspect ratio of the orthogonal meridians is of the order of 5:1.

References Cited in the file of this patent

UNITED STATES PATENTS

| | | |
|---|---|---|
| 2,668,867 | Ekstein | Feb. 9, 1954 |
| 2,788,381 | Baldwin | Apr. 9, 1957 |
| 2,964,636 | Cary | Dec. 13, 1960 |
| 2,983,888 | Wormser | May 9, 1961 |
| 2,994,053 | De Waard | July 25, 1961 |
| 3,062,964 | Lubin | Nov. 6, 1962 |